US009559805B2

(12) United States Patent
Bright-Thomas et al.

(10) Patent No.: US 9,559,805 B2
(45) Date of Patent: Jan. 31, 2017

(54) SELF-DESCRIBING ERROR CORRECTION OF CONSOLIDATED MEDIA CONTENT

(71) Applicant: Cisco Technology, Inc., San Jose, CA (US)

(72) Inventors: Paul G. Bright-Thomas, Wokingham (GB); Greg Hakonsen, Sokna (NO); Geir Sandbakken, Oslo (NO); William Geoffrey Prior, London (GB); Marcello Caramma, Bracknell (GB); Michael A. Ramalho, Lakewood Ranch, FL (US)

(73) Assignee: Cisco Technology, Inc., San Jose, CA (US)

( * ) Notice: Subject to any disclaimer, the term of this patent is extended or adjusted under 35 U.S.C. 154(b) by 45 days.

(21) Appl. No.: 14/531,015

(22) Filed: Nov. 3, 2014

(65) Prior Publication Data

US 2016/0127077 A1    May 5, 2016

(51) Int. Cl.
*H04L 1/00* (2006.01)
*G06F 11/10* (2006.01)
(Continued)

(52) U.S. Cl.
CPC ............. *H04L 1/0009* (2013.01); *G06F 11/10* (2013.01); *H04L 1/009* (2013.01); *H04L 1/0041* (2013.01);
(Continued)

(58) Field of Classification Search
CPC ..... H04L 1/0009; H04L 1/0042; H04L 1/0076
See application file for complete search history.

(56) References Cited

U.S. PATENT DOCUMENTS 6,141,788 A * 10/2000 Rosenberg ............ H03M 13/03
714/774
6,170,075 B1 * 1/2001 Schuster ............... H03M 13/05
714/776
(Continued)

FOREIGN PATENT DOCUMENTS

WO    2010099511 A1    9/2010

OTHER PUBLICATIONS

Watson, et al., "Forward Error Correction (FEC) Framework," Internet Engineering Task Force (IETF), Request for Comments: 6363, Standards Track, Oct. 2011, pp. 1-42.
(Continued)

*Primary Examiner* — Joseph D Torres
(74) *Attorney, Agent, or Firm* — Edell, Shapiro & Finnan, LLC

(57) ABSTRACT

Presented herein are downstream recovery (error correction) techniques for an aggregated/consolidated media stream. In one example, a consolidated media stream that includes source media packets from one or more sources is sent to one or more downstream receiving devices. Based on the source media packets, one or more self-describing recovery packets for downstream error correction of the source media packets are generated. The self-describing recovery packets include a mapping to the source media packets used to generate the self-describing recovery packets, thereby avoiding the addition of error correction information in the consolidated media stream. The one or more self-describing recovery packets are sent to each of the downstream receiving devices as a separate stream.

20 Claims, 6 Drawing Sheets

(51) Int. Cl.
*H04L 29/06* (2006.01)
*H04L 7/04* (2006.01)
*H04N 21/238* (2011.01)
*H04N 21/6437* (2011.01)
*H04N 7/15* (2006.01)

(52) U.S. Cl.
CPC ........... *H04L 1/0042* (2013.01); *H04L 1/0045* (2013.01); *H04L 1/0076* (2013.01); *H04L 1/0083* (2013.01); *H04L 1/0091* (2013.01); *H04L 7/04* (2013.01); *H04L 29/06176* (2013.01); *H04L 29/06517* (2013.01); *H04L 65/4076* (2013.01); *H04L 65/607* (2013.01); *H04L 65/608* (2013.01); *H04N 7/152* (2013.01); *H04N 21/238* (2013.01); *H04N 21/6437* (2013.01); *H04L 1/0057* (2013.01); *H04L 2001/0092* (2013.01); *H04L 2001/0093* (2013.01)

(56) References Cited

U.S. PATENT DOCUMENTS

| | | | | |
|---|---|---|---|---|
| 7,660,245 | B1* | 2/2010 | Luby | H04L 1/0041 370/230 |
| 7,716,559 | B2* | 5/2010 | Champel | H04L 1/0041 714/776 |
| 8,819,520 | B1* | 8/2014 | Slavetsky | H04L 69/40 714/761 |
| 2002/0107968 | A1* | 8/2002 | Horn | H04L 12/1881 709/230 |
| 2002/0116610 | A1* | 8/2002 | Holmes | H04L 9/3263 713/156 |
| 2002/0124172 | A1* | 9/2002 | Manahan | H04L 63/0853 713/176 |
| 2002/0144209 | A1* | 10/2002 | Ariel | H03M 13/27 714/792 |
| 2002/0146074 | A1* | 10/2002 | Ariel | H03M 13/27 375/240.27 |
| 2002/0147977 | A1* | 10/2002 | Hammett | H04N 5/4401 725/47 |
| 2002/0157058 | A1* | 10/2002 | Ariel | H03M 13/27 714/774 |
| 2003/0005386 | A1* | 1/2003 | Bhatt | H04L 1/0009 714/774 |
| 2003/0135631 | A1* | 7/2003 | Li | H04L 29/06027 709/231 |
| 2006/0029065 | A1* | 2/2006 | Fellman | H04L 1/004 370/389 |
| 2006/0048036 | A1* | 3/2006 | Miura | H03M 13/03 714/758 |
| 2006/0107187 | A1* | 5/2006 | Hannuksela | H04L 12/5693 714/776 |
| 2006/0109805 | A1* | 5/2006 | Malamal Vadakital | H04L 29/06027 370/299 |
| 2008/0002580 | A1* | 1/2008 | Kawada | H04L 1/0009 370/231 |
| 2008/0288986 | A1* | 11/2008 | Foster | G08B 13/19656 725/62 |
| 2009/0016228 | A1* | 1/2009 | Ichiki | H03M 13/2909 370/241 |
| 2009/0138784 | A1* | 5/2009 | Tamura | H03M 13/353 714/776 |
| 2009/0201805 | A1* | 8/2009 | Begen | H04L 1/0009 370/225 |
| 2009/0276686 | A1* | 11/2009 | Liu | H04L 1/0041 714/776 |
| 2010/0023842 | A1* | 1/2010 | Rahrer | H03M 13/3761 714/776 |
| 2010/0251060 | A1* | 9/2010 | Doi | H03M 13/2906 714/752 |
| 2011/0055666 | A1* | 3/2011 | Hedaoo | H03M 13/05 714/776 |
| 2011/0216841 | A1 | 9/2011 | Luby et al. | |
| 2013/0007567 | A1* | 1/2013 | Singh | H03M 13/35 714/774 |
| 2013/0290814 | A1 | 10/2013 | Hwang et al. | |
| 2014/0314157 | A1 | 10/2014 | Hwang et al. | |
| 2015/0029856 | A1* | 1/2015 | Rozenberg | H04L 69/40 370/235 |

OTHER PUBLICATIONS

Roca, et al., "Simple Reed-Solomon Forward Error Correction (FEC) Scheme for FECFRAME," Internet Engineering Task Force (IETF), Request for Comments: 6865, Standards Track, Feb. 2013, pp. 1-23.

International Search Report and Written Opinion in counterpart International Application No. PCT/US2015/057750, mailed Feb. 3, 2016, 10 pages.

* cited by examiner

| V | reserved | SourceBlockNumber | |
|---|---|---|---|
| EncSymIdx | EncSymCount (N) | SrcSymCount (K) | RefCount |
| StreamNoSSRC | | | |
| StrSeqStart | SeqCount | FWL | Mini Map |
| Maxi MAP | | | |
| ⋮ | | | |
| StreamNoSSRC | | | |
| StrSeqStart | SeqCount | FWL | Mini Map |
| Maxi MAP | | | |
| ⋮ | | | |

FIG.4

SELF-DESCRIBING ERROR CORRECTION OF CONSOLIDATED MEDIA CONTENT

TECHNICAL FIELD

The present disclosure relates to protection of aggregated/consolidated media content.

BACKGROUND

Media content (e.g., audio and/or video data) may be exchanged between devices in a number of different arrangements and for a wide variety of purposes. In certain cases, "aggregated" or "consolidated" media streams may be exchanged. A consolidated media stream includes packets that come from one or more source "streams" (at one or more hierarchical layers), but may not be combined into a common stream at any particular hierarchal level. Instead, a consolidated media stream is the multiplexed delivery of multiple streams to each of one or more devices.

BRIEF DESCRIPTION OF THE DRAWINGS

FIG. 4 is a diagram illustrating an example forward error correction (FEC) source block header generated in accordance example embodiments presented herein.

DESCRIPTION OF EXAMPLE EMBODIMENTS

Overview

Figure 1:
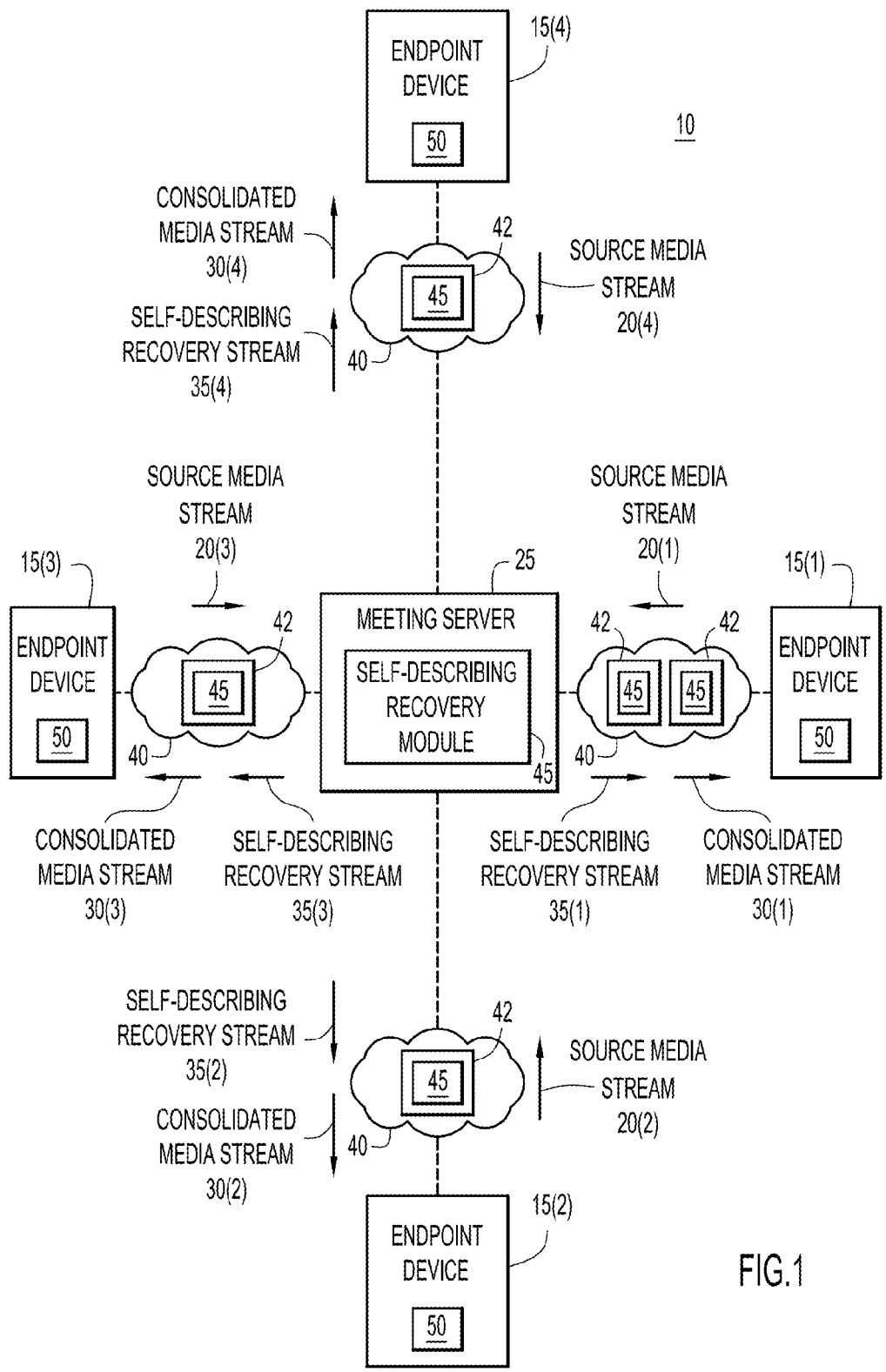
FIG. 1 is a block diagram of a system in which the self-describing recovery techniques presented herein may be implemented, according to an example embodiment.

Presented herein are downstream recovery (error correction) techniques for an aggregated/consolidated media stream. In one example, a consolidated media stream that includes source media packets from one or more sources is sent to one or more downstream receiving devices. Based on the source media packets, one or more self-describing recovery packets for downstream error correction of the source media packets are generated. The self-describing recovery packets include a mapping to the source media packets used to generate the self-describing recovery packets, thereby avoiding the addition of error correction information in the consolidated media stream. The one or more self-describing recovery packets are sent to each of the downstream receiving devices as a separate stream. The derivation of a stream of recovery packets in common to packets derived from multiple source media streams can greatly increase the effectiveness and efficiency of the recovery, compared to applying comparable error correction to individual streams. The result is a self-describing recovery scheme acting on a consolidated multi-stream aggregate requiring no change to the individual streams within the aggregate.

In certain examples, the flexibility of the scheme supports the application of FEC in a receiver-differential way, since (1) the degree of loss that needs to be protected/recovered is receiver-dependent and (2) the aggregate of streams sent, from which the recovery packets are derived, is receiver dependent (although possibly overlapping with other receivers). The joint protection of a defined set of source media packets for the generation of each recovery packet makes it likely that they will tend to be generated in a receiver-specific way; where used on a common path, the next FEC-enabled node before the receivers can be viewed as the single destination.

Example Embodiments

Consolidated media streams (i.e., the multiplexed delivery of multiple streams to each of one or more devices) may be used in a number of different circumstances. In one example, consolidated media streams are used in a multi-point switching arrangement, such as during online meetings or conference sessions that enable individuals at remote or different locations to communicate with one another. In accordance with multi-stream switching, media content may be captured at multiple endpoints and the captured media content may be contributed (sent) separately to a server (e.g., a meeting server). Subsets of the contributed streams may then be consolidated/aggregated and collectively distributed to the endpoint devices. In another example, consolidated media streams may be used in connection with the exchange of multiple streams between identical nodes, such as multipoint control units (MCUs). For example, when two or more switched MCUs cascade (e.g., for scaling or geographic deployment purposes), the MCUs may send many multiplexed Real-time Transport Protocol (RTP) streams between themselves creating large distributed conferences. Additionally, edge devices manage traffic in and out of administrative domains. Edge devices may be located at the edge of, for example, a core network, a branch office, a Small office/home office (SOHO), or between different types of networks. Typically, the edge devices provide services such as Network Address Translation (NAT) traversal and re-encryption for enhanced security over unmanaged networks. In use, multiple streams may be forwarded between edge devices and this scenario also allows for the consolidation of streams suitable for the application of self-describing multi-stream recovery.

The self-describing recovery techniques presented herein may be used in any of the above or other circumstances (e.g., point-to-point calls) to protect consolidated streams from packet loss. However, merely for ease of illustration, the self-describing recovery techniques are primarily described herein with reference to a multi-point switching example. As described further below, the techniques enable the use of a self-describing protection mechanism while satisfying constraints of low-latency, flexibility and tenability (laterally across streams, and longitudinally along paths), packet size limits, consistency with existing mechanisms such as RTP and Forward Error Correction (FEC), etc.

FIG. 1 is a block diagram of a system 10 in which the self-describing recovery (error correction) techniques in accordance with examples presented herein may be implemented during multi-point switching. The system 10 generally enables the establishment of an online meeting/conference between two or more endpoint devices through the use of multi-stream switching of media content. Shown in the example of FIG. 1 are four (4) endpoint devices (conference endpoints) 15(1), 15(2), 15(3), and 15(4) that participate in the online meeting. The endpoint devices 15(1)-15(4) are user devices that may take on any of a number of different forms. For example, the endpoint devices may be computers (e.g., desktop computers, laptop computers, tablet computers, etc.), mobile devices (e.g., mobile phones), display screens, teleconferencing/telepresence systems, etc.

An online meeting may involve the real-time sharing of media content (i.e., audio and/or video content). The video content may be content captured by a camera, desktop content (i.e., a capture of all documents, videos, images and/or any other content that is currently displayed at an endpoint device), application content (i.e., a capture of one or more specific applications currently displayed at an endpoint device), etc. As such, each of the endpoint devices 15(1)-15(4) generate a stream of media content, referred to herein as source media streams 20(1)-20(4), respectively, that may be presented at the other endpoint devices. The source media streams 20(1), 20(2), 20(3), and 20(4) each include one or more source media packets corresponding to the media content collected/captured at the endpoint devices 15(1), 15(2), 15(3), and 15(4), respectively.

The source media streams 20(1)-20(4) are provided to meeting server 25, which is configured to enable multistream switching of the captured media content. In general, multi-stream switching of media content involves real-time switching between the source media streams at multiple receivers (multiple endpoint devices). For example, meeting server 25 provides consolidated media streams 30(1), 30(2), 30(3), and 30(4) to the endpoint devices 15(1), 15(2), 15(3), and 15(4), respectively. The consolidated media streams 30(1)-30(4) include source media packets collected from a plurality of the source media streams 20(1)-20(4) (e.g., media packets from all of the streams or a subset of the streams). The consolidated media streams 30(1), 30(2), 30(3), and 30(4), when received at the endpoint devices 15(1), 15(2), 15(3), and 15(4), respectively, enable endpoint devices to switch between the media sources in real-time.

Multi-stream switching refers to a scheme in which each of a plurality of receivers receives media streams from one or more sources simultaneously, enabling the concurrent visibility (or audibility) of multiple sources, and consequently a rich multi-party conferencing experience with low cost and latency. However, multi-stream switching of media content also increases the coupling between the endpoint devices and exposes each to the effects of packet loss in media contribution to or distribution from the server. For example, packet loss on distribution to one receiver leg may result in recovery actions later in a source leg to the server that may impair the experience of the other receivers that did not themselves experience packet loss.

This makes the importance of downstream error correction (recovery) schemes in a switched video implementation even greater than in transcoding video conferencing. Accordingly, presented herein are techniques that enable devices within the end-to-end media path to generate "self-describing" recovery packets that are transmitted/sent to endpoint devices in a separate stream than the consolidated media streams. As described further below, the self-describing recovery packets may be used at endpoint and/or mid-point devices to perform downstream error correction of the consolidated media stream (e.g., recover/repair lost, dropped, or corrupt media packets). Additionally, also as described further below, the recovery packets, in accordance with examples presented herein, are "self-describing" because the recovery packets utilize a recovery-to-media mapping where the recovery packets, and not the media packets, identify the association between recovery and media packets. This self-describing nature of the recovery packets enables the source media packets to be sent unmodified (i.e., no recovery or error correction overhead is added to the source media packets within the consolidated media streams to identify associated recovery packets or to include recovery information).

The self-describing recovery techniques are primarily described with reference to the use of FEC as the mechanism that generates recovery symbols. As such, the self-describing recovery packets are sometimes referred to herein as self-describing FEC packets and a stream of such packets is sometimes referred to herein as a self-describing FEC stream. The self-describing recovery techniques may make use of a number of different conventional FEC mechanisms such as, for example, a Reed-Solomon implementation.

Returning to the example of FIG. 1, meeting server 25 generates and sends four (4) self-describing recovery streams 35(1), 35(2), 35(3), and 35(4) downstream to the endpoint devices 15(1), 15(2), 15(3), and 15(4), respectively. As noted, the self-describing recovery streams 35(1)-35(4) are generated in a manner that enables the source media packets in the consolidated media streams 30(1)-30(4) to be sent unmodified (i.e., with no added overhead) and are sent substantially in parallel to the consolidated media streams using the same transport mechanism. In one example, the source media packets within the consolidated media streams 30(1)-30(4) and the self-describing recovery packets within the self-describing recovery streams 35(1)-35(4) are sent using the RTP.

The sending of the self-describing recovery streams substantially in parallel to the corresponding consolidated source media streams means that consolidated source media packets are sent around the same time as the self-describing recovery streams (i.e., in a sufficiently close temporal proximity to be used for recovery of the corresponding consolidated source media streams timely to their intended use).

The meeting server 25 communicates with the endpoint devices 15(1)-15(4) over one or more networks 40. The networks may be, for example, local area networks (LANs), wide area network (WANs), wireless WANs, wireless LANs etc., and any combination thereof. Positioned in the network(s) 40 between the meeting server 25 and each of the endpoint devices 15(1)-15(4) may be zero or more mid-point devices 42 that forward and/or process traffic sent between the meeting server and endpoint devices. The mid-point devices 42 form "hops" within the end-to-end path and may be, for example, networking devices (e.g., switches, routers, firewalls, etc.), servers, etc. In accordance with the self-describing recovery techniques presented herein, the self-describing recovery streams 35(1)-35(4) can be encoded/decoded at any hop or hops on the end-to-end path without the endpoint knowledge or associated signaling. "Encoding" is the generation of recovery packets from a set of one or more consolidated source media packets, and "decoding" is the re-generation of missing source media packets by the combination of received recovery packets with those source media packets that are successfully received.

The ad-hoc nature of the self-describing packets enables the dynamic and/or adaptive correction of errors, for example, by utilizing FEC on known/determined error prone links and not utilizing bandwidth for FEC on links that are known/determined to be relatively error-free. Moreover, the self-describing property and the resulting ability to add FEC at any point in the delivery path of source media streams even allows the use of FEC with media streams from sources that are incapable of generating such protection themselves, and/or are unaware that such mechanisms are used or even that loss exists which needs to be recovered.

As shown in FIG. 1, the meeting server 25 and the mid-point devices 42 may include a self-describing recovery module 45 that is configured to perform the self-describing recovery techniques (e.g., generate/encode and/or decode self-describing recovery packets). The endpoint devices 15(1)-15(4) include a receiver module 50 configured to decode and use the self-describing recovery packets for FEC.

FIG. 1 illustrates one exemplary arrangement in which the self-describing recovery techniques in accordance with embodiments presented herein may be implemented. It is to be appreciated that the arrangement of FIG. 1 is merely illustrative and does not limit the use of the self-describing recovery techniques. For example, it is to be appreciated that the function of self-describing recovery module 45 may be incorporated into any device where it may be advantageous to do so as defined by, for example, the system or network designers. Additionally it is to be appreciated that in certain examples the source devices may generate recovery packets themselves, there may be no mid-point devices that participating in self-describing recovery techniques, and/or only certain mid-point devices may participate in the self-describing recovery techniques, among other possible implementations.

Figure 2:
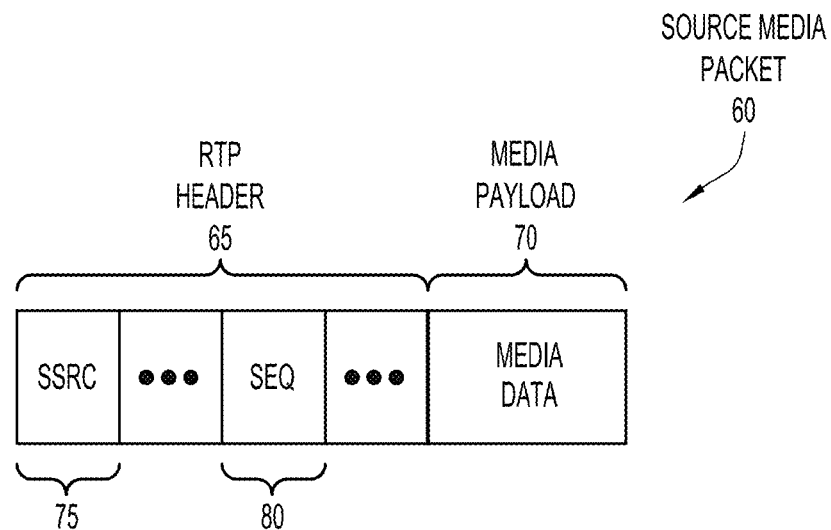
FIG. 2 is a diagram of a source media packet forming part of a consolidated media stream in accordance with example embodiments presented herein.

FIG. 2 is a diagram illustrating an example source media packet 60. As shown, the source media packet 60 includes an RTP header 65 and a media payload 70. The RTP header 65 includes packet information, such as the synchronization source identifier (SSRC) 75 that uniquely identifies the source of the media stream, the packet sequence number (SEQ), etc. One or more optional header extensions (not shown in FIG. 2), packet tags (also not shown in FIG. 2) added for authentication or other purposes may also be included in source media packet 60.

In accordance with the illustrative example, the meeting server 25 composes a FEC (recovery) source block from the plurality of unaltered source media packets taken from the one or more RTP media streams transmitted on a same network interface port. The entirety of the source media packets is protected, including their RTP headers, packet tags, etc. In accordance with the techniques presented herein, the source block is formed from source media packets received within a time-limited bound (window). The time-limited window may have a static (e.g., predetermined/selected) time length or a dynamic time length that is determined, for example, based on attributes of the individual media stream, consolidated media stream, etc.

For low-latency bi-directional communication applications it is desirable that this time-limited window be small enough to not unduly impair the effectiveness of communication, since packets are only recovered and available for consumption at the receiver at the conclusion of this time window, which may delay them relative to their ideal arrival time. The constraint on the time window necessarily constrains the size of the source block that may be obtained from a given rate of packet transmission. It is evident that for a given length of time-window, a larger source block may be derived from the aggregation of packets in a plurality of streams, than in the treatment of each stream on an individual basis, and this is material in enhancing the effectiveness of recovery for a given proportion of bandwidth devoted to the recovery stream compared to the source media streams.

After generation of the source block, one or more recovery symbols, sometimes referred to herein as FEC symbols or repair symbols, are generated from encoding the source block. These generated recovery symbols are sent in one or more RTP packets, referred to herein as a self-describing recovery packet, in a RTP recovery stream, referred to herein as a self-describing recovery stream, that is separate from the consolidated media stream. However the consolidated media stream and the self-describing recovery stream are sent on the same network interface port using the same transport mechanism (e.g., RTP).

Figure 3:
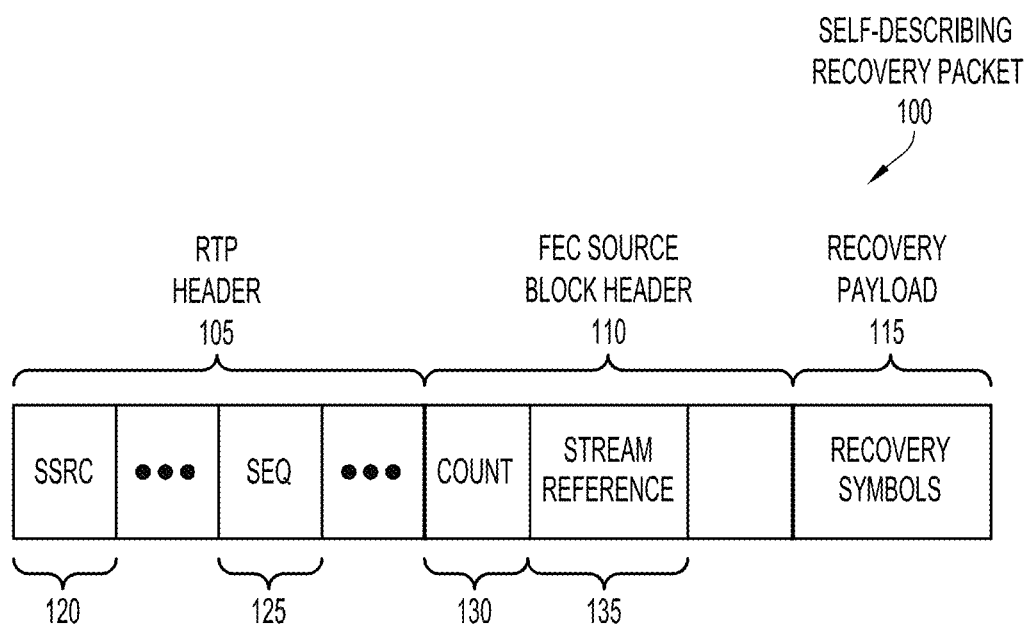
FIG. 3 is a diagram of a self-describing recovery packet in accordance with example embodiments presented herein.

FIG. 3 is a diagram illustrating an example self-describing recovery packet 100 in accordance with examples presented herein. The self-describing recovery packet 100 maps to the source media packets (i.e., uses a recovery/FEC-to-media mapping) so as to avoid the addition of information to the source media packets. This self-describing property of the recovery packets enables the media packets to be sent unaltered (i.e., sent with no FEC overhead) and enables the FEC to be added/removed at any point, and to any degree, along the transmission path of the packets. This also allows FEC to be added to conventional RTP sources that are not enabled or aware that the self-describing recovery techniques are used within the end-to-end path.

As shown in FIG. 3, the self-describing recovery packet 100 includes an RTP header 105, a FEC source block header 110, and a recovery payload 115. As noted above with reference to RTP header 65 of the source media packets, the RTP header 105 includes packet information (e.g., Synchronization Source Identifier (SSRC) 120, Sequence Number (SEQ) 125, etc.). The FEC source block header 110 describes the composition of the source block (i.e., the packets in one or more media streams that are collectively protected) and is followed by the recovery payload 115 that includes the recovery symbol from which source symbol recovery may be performed. The FEC source block header 110 and the recovery payload 115 are, in essence, the RTP payload for the packet 100.

In general, the FEC source block header 110 references the streams that are protected by the self-describing recovery packet 100. That is, the FEC source block header 110 includes a count 130 of streams referenced in the FEC source block header 110 and, for each referenced source media stream, a stream reference 135 describing the packets from that stream that are used in the source block. The stream reference(s) 135 may include the stream SSRC, the sequence number of the first packet from that stream referenced in this source block, and a count of contiguous packets or alternatively a bitmap which may efficiently describe discontinuous packets.

FIG. 4 is a diagram illustrating an example FEC source block header generated in accordance the self-describing recovery techniques. Table 1, below, identifies the parameters shown in FIG. 4.

TABLE 1

| Parameter Name/Identifier | Description |
|---|---|
| V | Version of the protocol. |
| Source block number | Identity of the source block with which the self-describing recovery packet is associated. Increments by a value of "1." |

TABLE 1-continued

| Parameter Name/Identifier | Description |
| --- | --- |
| EncSymIdx | Index of the self-describing recovery packet. |
| EncSymCount (N) | Units of data generated by the encoding process (meaning number of elements in source block and self-describing recovery packet). Referred to as N in Reed-Solomon techniques. |
| SrcSymCount (K) | Number of elements in the source block. Referred to as K in the Reed-Solomon techniques. |
| RefCount | Number of consecutive blocks of packets referenced by SSRCs. |
| StreamNoSSRC | The SSRC of the protected RTP stream with implicit positioning starting from index 0 in the encoding block. |
| StrSeqStart | The first sequence number of protected RTP packets from the referenced RTP stream. |
| SeqCount | The number of consecutive RTP packets following the stream sequence number start giving the protection range. |
| FWL (Fragment Word Length) | Number of 32 bit words indicating fragmentation for a referenced packet. |
| Mini Map | If FWL is zero, the mini map will indicate fragmentation status for up to 8 RTP packets indicated from the least significant bit. |
| Maxi Map (optional) | Includes 32 bit fragmentation maps, where the number of fragmentation maps is indicated in FWL. |

The protection of many source media streams in each source block, and the need to describe the source block composition in each self-describing recovery packet, leads to a variable length FEC source block header. In general, there are two dynamic length parameters impacting the size of the FEC source block header, namely the RefCount parameter (i.e., parameter indicating the number of referenced RTP streams that are protected) and the FWL (i.e., parameter indicating number of 32 bit fragmentations map identifying which packets are fragmented from the set indicated by StrSeqStart and SeqCount). Additionally, a single RTP source media stream may be referenced multiple times (i.e., the SSRC is not used as a key in a map). The expansion of the self-describing recovery packets relative to source media packets is handled through a logical fragmentation scheme applied in the composition of the source block prior to encoding.

In general, fragmentation may be implemented for several purposes and includes the logical splitting of a source media packet included in an FEC source block into two or more units. In one arrangement, fragmentation is utilized as an optimization based on source media packet sizes (i.e., more optimized FEC source blocks). For example, if a certain distribution of input media packet lengths is received, it may be advantageous to fragment packets in a manner that is tailored to those input lengths (i.e., create a source block tailored to the size of the packets). In certain examples, fragmentation may be dynamically applied to tune the size of the encoded payload length to match the available repair length. In other words, the techniques presented herein enable the use of fragmentation for FEC input blocks that can be optimized for more efficient FEC coverage under highly varied input block sizes input to the FEC scheme.

Alternatively, since source media packet generation is not involved in the provisioning of FEC, there is no restriction on the size of a source media packet. As such, source media packets may have a size that is at, or close to, the network transmission unit limit (or larger if relying on transport-layer fragmentation). Since the whole of source media packets are described by each self-describing recovery packet (i.e., recovery symbols are typically at least as large as the source symbols), the addition of an FEC source block header and the RTP header to the recovery payload could result in a self-describing recovery packet with an overall length that exceeds the transmission unit limit. In order to alleviate the need to rely on transport-level fragmentation, the self-describing recovery techniques use fragmentation to constrain the size of the source symbols and thus maintain the resulting self-describing recovery packets under the network transmission limit.

Merely for ease of illustration, the fragmentation schemes in accordance with examples presented herein are illustrated with reference to fragmentation of source media packets to comply with the network transmission limit. As noted, other types of fragmentation optimizations may be used in other examples.

More specifically, in an illustrative fragmentation example a set of source media packets are received during a time-limited window from a plurality of media sources. The source media packets are defined as the basis from which to form an FEC source block, from which the format and length of the FEC source block header can be determined. If the length of the RTP header for self-describing recovery packet (FEC_RTP_HDR_length), when combined with the length of the FEC source block header (FEC_SRC_BLK_HDR_length) and the maximum length of any of the source media packets defined to be contributing to this source block (max(SRC_PKT_length)) exceeds a predetermined maximum packet length (MAX_PKT_length), then the fragmentation scheme is invoked. This defines a maximum source symbol length (SRC_SYM_length) for all elements of a source block (i.e., a maximum length for all source symbols), in one example, as shown below in Equation 1.

$$\max(\text{SRC\_PKT\_length})/2 <= \text{SRC\_SYM\_length} < \text{MAX\_PKT\_length} - \text{FEC\_RTP\_HDR\_length} - \text{FEC\_SRC\_BLK\_HDR\_length}$$

Equation 1

Therefore, in accordance with the Equation 1, each source media packet that has a length that exceeds SRC_SYM_length is broken into two consecutive source symbols, the first system having a length equal to the maximum source symbol length (SRC_SYM_length). Every source packet having a length that is smaller than this limit is included in the source block as a single source symbol, zero-padded out to SRC_SYM_length, but is not padded out to the length of the longest source media packet.

The source block is encoded according to the FEC scheme implemented, as it would be without fragmentation, but now a source media packet that is lost may remove up to two consecutive source symbols. Self-describing recovery packets generated from encoding of a source block using fragmentation may be smaller than some or all of the source media packets they protect. A given FEC/recovery bandwidth overhead is now distributed across more (smaller) packets than would have been the case without fragmentation. The smaller recovery packets allows more granular control of bandwidth overhead reserved for recovery, particularly useful in low packet-rate streams, while maintaining low latency through small source blocks.

It is to be appreciated that the above described "fragmentation" is a purely logical application during the formation of the source block prior to encoding. The original source media packets are transmitted in the consolidated media stream in a complete (non-fragmented) manner.

Since the fragmentation dictates how the source block is formed, and individual packet lengths are not known at recovery, the use of fragmentation may be described in the FEC source block header. In a simple case of fragmentation of a source media packet into at most two source symbols, this fragmentation indication can be implemented as a per-packet map (bitmap) that describes whether or not a packet is converted into two symbols in the source block. The map may be segmented and included at the stream reference level, or unified in a map of the entire source block. If logical fragmentation into more than two source symbols is required, a more complex fragmentation map format may be used, with each map composed of sub-fields sufficient in size to describe the maximum permitted number of fragments for any source media packet.

Alternatively, it is possible to format the source block such that packet lengths are encoded in a first fragment, and always set to zero for a second fragment, with second fragments placed contiguously at the tail of the source block. This allows a two-stage recovery process to determine the lengths of all packets, and therefore which packets are fragmented and which are not fragmented. This eliminates the need for any type of fragmentation identification in the FEC source block header.

Figure 5:
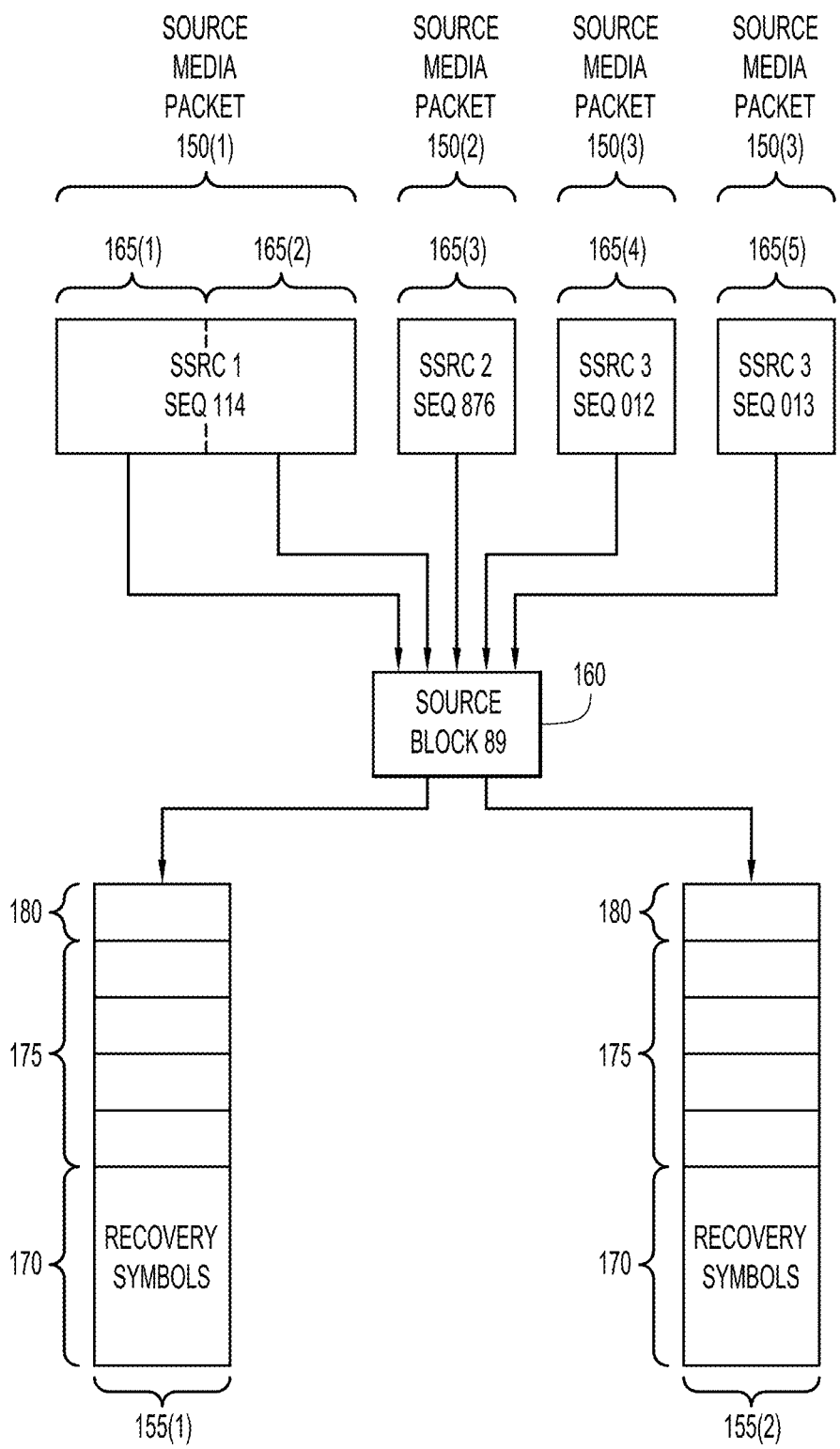
FIG. 5 is a diagram of an implementation of the self-describing recovery techniques in accordance with example embodiments presented herein.

FIG. 5 is a schematic diagram of an implementation of the self-describing recovery techniques. In the example of FIG. 5, four source media packets 150(1)-150(4) are received from one of three sources during a selected time-limited window/period. As described further below, the four source media packets 150(1)-150(4) are encoded to generate two self-describing recovery packets 155(1) and 155(2).

Source media packet 150(1) is received from source 1 (SSRC 1) and has a sequence number (SEQ) 114, while source media packet 150(2) is received from source 2 (SSRC 2) and has a sequence number 876. Source media packets 150(3) and 150(4) are both received from source 3 (SSRC 3). Source media packet 150(3) has a sequence number 1, while source media packet 150(4) has a sequence number 13. As shown, the source media packets 150(1)-150(4) are used to form source block 160 that is has a source block number of 89.

In the example of FIG. 5, source media packet 150(1) has a length of 1501 bytes, but the maximum transmission unit (MTU) (i.e., the maximum supported size for the protocol data units) is 1500 bytes. Accordingly, source media packet 150(1) has a length that exceeds the maximum source symbol length (SRC_SYM_length) of the self-describing FEC techniques. The remaining source media packets 150(2)-150(4) each have a length that is less than the maximum source symbol length. In order to comply with the MTU, source media packet 150(1) is logically fragmented within the source block 160 such that source block 160 includes five source symbols 165(1)-165(5). Source symbols 165(1) and 165(2) each correspond to one of the two fragments of source media packet 150(1). Source symbol 165(3) corresponds to source media packet 150(2), source symbol 165(4) corresponds to source media packet 150(3), and source symbol 165(5) corresponds to source media packet 150(4). The logically fragmented source media packet 150(1) from SSRC 1 utilizes two indexes in the source block 160.

After the logical fragmentation, the source symbols 165(1)-165(5) are encoded using an FEC mechanism to generate recovery symbols 170 for incorporation in the two self-describing recovery packets 155(1) and 155(2). As described above, the two self-describing recovery packets 155(1) and 155(2) also include FEC source header blocks 175 and RTP headers 180.

As shown in FIG. 5, the FEC generation is applied to an arbitrary subset of source media packets received/obtained within a time-limited window of a consolidated media stream. Application of FEC on a consolidated stream generally results in the FEC covering more bits per unit time which, in turn allows for better loss recovery for a given FEC overhead bandwidth (especially burst loss recovery) and allows for bounded FEC-induced latency.

As described above, a consolidated media stream may be sent from a network interface port of a device and the consolidated media stream is accompanied by a self-describing recovery (FEC) stream. The self-describing recovery stream is sent substantially in parallel with the consolidated media stream on the same network interface port of the device. The self-describing nature of the recovery stream (i.e., recovery or FEC-to-media mapping included in the recovery stream) enables the source media packets within the consolidated media stream to be sent unmodified (i.e., with no added recovery overhead).

The self-describing properties of the recovery packets also allow for the specification of the arbitrary subset of media data in the overhead of the FEC packets (i.e., FEC-to-media mapping). As detailed above, the inclusion of an FEC-to-media mapping within the recovery stream leads to variable overhead in the recovery packets (i.e., a variable length FEC source block header). This challenge is addressed through the use of the logical fragmentation described above, thereby yielding an efficient FEC-to-media mapping that does not require modification of the associated source media packets.

As noted above, the ad-hoc nature of the self-describing recovery packets enables the dynamic and/or adaptive correction of errors on selected network links. That is, because the recovery packets are self-describing and do not utilize overhead added into the underlying source media packets, the FEC protection can be generated and/or removed at various network hops, including mid-point devices, without affecting the flow of the source media packets.

Figure 6:
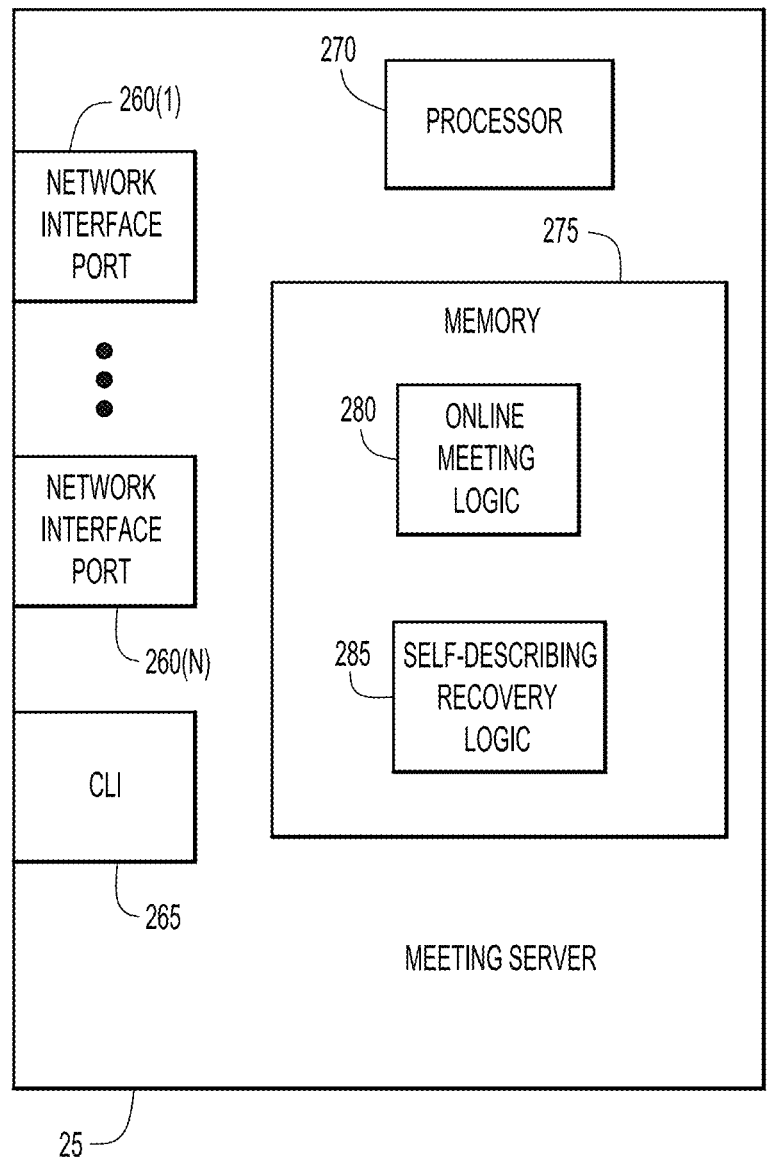
FIG. 6 is a block diagram of a device configured to generate self-describing recovery packets sent with a consolidated media stream in accordance with example embodiments presented herein.

FIG. 6 is a block diagram of a device, such as meeting server 25, configured to operate in accordance with examples presented herein to generate self-describing recovery packets sent with a consolidated media stream. As shown, meeting server 25 comprises a plurality of network interface units (e.g., ports) 260(1)-260(N), a command-line interface (CLI) 265, a processor 270, and a memory 275 comprising online meeting software/logic 280 and self-describing recovery logic 285.

The network interface units 260(1)-260(N) provide network communications between the meeting server and the end-point devices, mid-pint devices, and/or other network components. Network interface units 260(1)-260(N) may be, for example, Ethernet ports of a network interface card (NIC) implemented in one or more application-specific integrated circuits (ASICs). The CLI 265 is a mechanism by which commands can be delivered to the meeting server 106 in the form of successive lines of text (command lines). It should be appreciated that use of the CLI 265 is merely an example and that other mechanisms may also or alternatively be provided for a network administrator to deliver commands to the meeting server 25.

Memory 275 may comprise read only memory (ROM), random access memory (RAM), magnetic disk storage media devices, optical storage media devices, flash memory devices, electrical, optical, or other physical/tangible memory storage devices. The processor 270 is, for example, a microprocessor or microcontroller that executes instructions for the online meeting logic 280 and the user device evaluation logic 285. Thus, in general, the memory 275 may comprise one or more tangible (non-transitory) computer readable storage media (e.g., a memory device) encoded with software comprising computer executable instructions and when the software is executed (by the processor 270) it is operable to perform the operations in connection with setting up and/or hosting an online meeting (through execution of online meeting logic 280) and to perform the operations described herein with connection to the self-describing recovery techniques (through execution of self-describing recovery logic 285).

Figure 7:
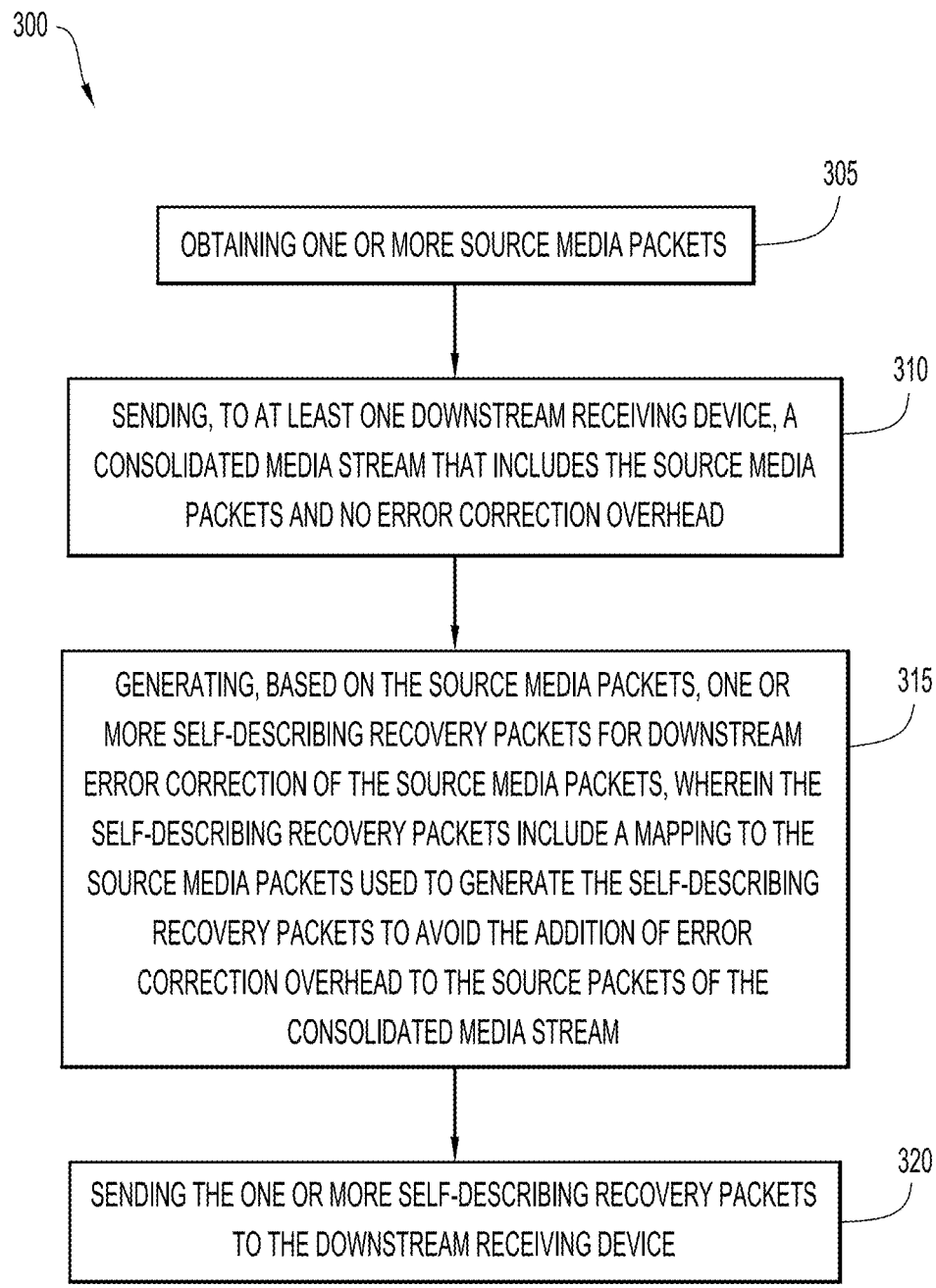
FIG. 7 is a flowchart of a method in accordance with example embodiments presented herein.

FIG. 7 is a flowchart of a method 300 in accordance with examples presented herein. Method 300 begins at 305 where one or more source media packets are obtained (e.g., received, generated, etc.) at a device. At 310, a consolidated media stream that includes the source media packets and no error correction overhead is sent to a downstream receiving device. At 315, one or more self-describing recovery packets for downstream error correction of the source media packets are generated based on the source media packets. The self-describing recovery packets include a mapping to the source media packets used to generate the describing recovery packets to avoid the addition of error correction overhead in the consolidated media stream. At 320, the one or more self-describing recovery packets are sent to the downstream receiving device.

Presented herein are recovery (e.g., FEC) techniques and allow one or more FEC algorithms to be efficiently applied to multiple media streams carried over a common path using RTP. In general, the recovery scheme leaves media packets unchanged and describes the set of source packets encoded in the recovery (FEC) packets. This allows protection against packet loss of multi-stream aggregates of high and low packet-rate streams with distributed overhead, low latency and zero alteration to media sources. The techniques presented herein are suitable for packet loss resilience of switched multi-stream video conferencing such that multiple media streams on the same port can be protected as an aggregate. The composition of the source blocks (sets of protected packets or source symbols) is completely flexible and dynamic and the overhead is distributed across an aggregate rather than individual streams.

The techniques also enable the use of larger source blocks than can be used to protect individual streams, thereby increasing recovery efficiency. Furthermore, low packet-rate streams can be protected without incurring high protection overhead or latency. Protected packets can be obtained within a defined time-window, thereby controlling recovery latency. The techniques also avoid the addition of information to source media packets avoids need for re-authentication, as well as limiting additional bandwidth in simple cases. The techniques have applicability to a mixture of streams of variable packet size and packet rate (i.e., packets of different sizes can be protected with balanced overhead. Transport-layer fragmentation is eliminated by avoiding the production of recovery packets larger than the MTU.

As noted above, the self-describing recovery techniques have been primarily described herein with reference to a multi-point switching example. However, it is to be appreciated that source media packets from any RTP source can be protected through the use of the self-describing recovery techniques while satisfying constraints of low-latency, flexibility and tenability (laterally across streams, and longitudinally along paths), packet size limits, consistency with existing mechanisms such as RTP and FEC, etc. For example, the self-describing recovery techniques may be used in media-server to media-server examples (for RTP media aggregates between the servers), in MCU to MCU communications, at edge devices, point-to-point calls, etc. to protect consolidated streams from packet loss. However, merely for ease of illustration, the self-describing recovery techniques are primarily described herein with reference to a multi-point switching example. More generally, the self-describing recovery techniques provide an efficient FEC protection mechanism that may be used with any media stream aggregate for encoding and/or at any place in a network.

In one form, a method is provided comprising: obtaining one or more source media packets; sending, to at least one downstream receiving device, a consolidated media stream that includes the source media packets and no error correction overhead; generating, based on the source media packets, one or more self-describing recovery packets for downstream error correction of the source media packets, wherein the self-describing recovery packets include a mapping to the source media packets used to generate the self-describing recovery packets to avoid the addition of error correction overhead to the source packets of the consolidated media stream; and sending the one or more self-describing recovery packets to the downstream receiving device.

In another form, an apparatus is provided comprising: one or more network interface devices; a memory; and a processor coupled to the memory and the network interface devices, wherein the processor: obtains one or more source media packets; sends, to at least one downstream receiving device, a consolidated media stream that includes the source media packets and no error correction overhead; generates, based on the source media packets, one or more self-describing recovery packets for downstream error correction of the source media packets, wherein the self-describing recovery packets include a mapping to the source media packets used to generate the self-describing recovery packets to avoid the addition of error correction overhead to the source packets of the consolidated media stream; and sends the one or more self-describing recovery packets to the downstream receiving device.

In still another form, one or more computer readable storage media are provided encoded with software comprising computer executable instructions and when the software is executed operable to: obtain one or more source media packets; send, to at least one downstream receiving device, a consolidated media stream that includes the source media packets and no error correction overhead; generate, based on the source media packets, one or more self-describing recovery packets for downstream error correction of the source media packets, wherein the self-describing recovery packets include a mapping to the source media packets used to generate the self-describing recovery packets to avoid the addition of error correction overhead to the source packets of the consolidated media stream; and send the one or more self-describing recovery packets to the downstream receiving device.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
obtaining one or more source media packets;
sending, to at least one downstream receiving device, a consolidated media stream that includes the source media packets and no error correction overhead;
generating, based on the source media packets, one or more self-describing recovery packets for downstream error correction of the source media packets, wherein the self-describing recovery packets include a mapping to the source media packets used to generate the self-describing recovery packets to avoid the addition of error correction overhead to the source packets of the consolidated media stream, wherein generating the one or more self-describing recovery packets for downstream error correction of the source media packets comprises:
composing a source block that includes the source media packets as source symbols;
generating one or more recovery source block headers that describe the composition of the source block, wherein the recovery source block header includes a count of source media streams referenced in the recovery source block header and, for each referenced source media stream, a stream reference describing the source media packets from that stream which are used in the source block, wherein a source media stream reference comprises a stream synchronization source identifier, a sequence number of the first packet from that source media stream referenced in this source block, and at least one of a count of contiguous packets or a bitmap which describes discontinuous packets; and
generating recovery symbols for the source media packets; and
sending the one or more self-describing recovery packets to the downstream receiving device.

2. The method of claim 1, wherein the consolidated media stream sent to the downstream receiving device may be overlapping in composition with a consolidated media stream sent to an alternate downstream receiving device.

3. The method of claim 1, wherein the use and degree of recovery symbols may be dynamically configured based on distribution loss conditions between a sending device and the downstream receiving device.

4. The method of claim 1, wherein composing a source block comprises:
on a packet-by-packet basis, determining if any of the source media packets should be logically fragmented as two or more source symbols within the source block.

5. The method of claim 4, wherein determining if any of the source media packets should be logically fragmented comprises:
determining whether or not a length of a transport header for a self-describing recovery packet, when combined with the length of a recovery source block header and a maximum length of the recovery payload, exceeds a predetermined maximum packet length.

6. The method of claim 4, wherein determining if any of the source media packets should be logically fragmented comprises:
identifying a distribution for the lengths of the source media packets and correlated the size of the source symbols in the source block with the identified distribution of the source media packet lengths.

7. The method of claim 4, wherein the application of logical fragmentation to each source media packet is described by a compact map in the recovery source block header.

8. The method of claim 4, further comprising applying logical fragmentation to each source media packet that is described by an ordered presentation of first and second fragments, enabling the determination of packet lengths in a split recovery process without the use of an explicit fragmentation map.

9. The method of claim 1, wherein generating the recovery symbols for the source media packets comprises:
performing forward error correction (FEC) encoding of the source media packets.

10. The method of claim 1, wherein the downstream receiving device is a mid-point device located upstream from an endpoint device, and wherein the method further comprises:
decoding the self-describing recovery packets to perform error correction of the source media packets and to generate a set of error corrected source media packets;
generating a consolidated media stream that includes the error corrected source media packets;
generating, based on the error corrected source media packets, one or more further self-describing recovery packets for downstream error correction of the error corrected source media packets, wherein the additional self-describing recovery packets include a mapping to the error corrected source media packets;
sending the consolidated media stream that includes the error corrected source media packets to a second downstream receiving device; and
sending the one or more additional self-describing recovery packets to the second downstream receiving device.

11. An apparatus comprising:
one or more network interface devices;
a memory; and
a processor coupled to the memory and the network interface devices, wherein the processor:
obtains one or more source media packets,
sends, to at least one downstream receiving device, a consolidated media stream that includes the source media packets and no error correction overhead;
generates, based on the source media packets, one or more self-describing recovery packets for downstream error correction of the source media packets, wherein the self-describing recovery packets include a mapping to the source media packets used to generate the self-describing recovery packets to avoid the addition of error correction overhead to the source packets of the consolidated media stream, wherein to generate the one or more self-describing recovery packets for downstream error correction of the source media packets, the processor:
composes a source block that includes the source media packets as source symbols;
generates one or more recovery source block headers that describe the composition of the source block, wherein the recovery source block header includes a count of source media streams referenced in the recovery source block header and, for each referenced source media stream, a stream reference describing the source media packets from that stream which are used in the source block, wherein a source media stream reference comprises a stream synchronization source identifier, a sequence number of the first packet from that source media stream referenced in this source block, and at least one of a count of contiguous packets or a bitmap which describes discontinuous packets; and generates recovery symbols for the source media packets; and sends the one or more self-describing recovery packets to the downstream receiving device.

12. The apparatus of claim 11, wherein to compose a source block, the processor:

determines, on a packet-by-packet basis, if any of the source media packets should be logically fragmented as two or more source symbols within the source block.

13. The apparatus of claim 12, wherein the application of logical fragmentation to each source media packet is described by a compact map in the recovery source block header.

14. The apparatus of claim 12, wherein the processor is configured to apply a logical fragmentation to each source media packet that is described by an ordered presentation of first and second fragments, enabling the determination of packet lengths in a split recovery process without the use of an explicit fragmentation map.

15. The apparatus of claim 11, wherein the downstream receiving device is a mid-point device located upstream from an endpoint device, and wherein the processor further:

decodes the self-describing recovery packets to perform error correction of the source media packets and to generate a set of error corrected source media packets;

generates a consolidated media stream that includes the error corrected source media packets;

generates, based on the error corrected source media packets, one or more further self-describing recovery packets for downstream error correction of the error corrected source media packets, wherein the additional self-describing recovery packets include a mapping to the error corrected source media packets;

sends the consolidated media stream that includes the error corrected source media packets to a second downstream receiving device; and sends the one or more additional self-describing recovery packets to the second downstream receiving device.

16. One or more non-transitory computer readable storage media encoded with software comprising computer executable instructions and when the software is executed operable to:

obtain one or more source media packets;

send, to at least one downstream receiving device, a consolidated media stream that includes the source media packets and no error correction overhead;

generate, based on the source media packets, one or more self-describing recovery packets for downstream error correction of the source media packets, wherein the self-describing recovery packets include a mapping to the source media packets used to generate the self-describing recovery packets to avoid the addition of error correction overhead to the source packets of the consolidated media stream, wherein the instructions operable to generate the one or more self-describing recovery packets for downstream error correction of the source media packets comprise instructions operable to:

compose a source block that includes the source media packets as source symbols;

generate one or more recovery source block headers that describe the composition of the source block, wherein the recovery source block header includes a count of source media streams referenced in the recovery source block header and, for each referenced source media stream, a stream reference describing the source media packets from that stream which are used in the source block, wherein a source media stream reference comprises a stream synchronization source identifier, a sequence number of the first packet from that source media stream referenced in this source block, and at least one of a count of contiguous packets or a bitmap which describes discontinuous packets; and generate recovery symbols for the source media packets; and send the one or more self-describing recovery packets to the downstream receiving device.

17. The computer readable storage media of claim 16, wherein the instructions operable to compose a source block comprise instructions operable to:

determine, on a packet-by-packet basis, if any of the source media packets should be logically fragmented as two or more source symbols within the source block.

18. The computer readable storage media of claim 17, wherein the application of logical fragmentation to each source media packet is described by a compact map in the recovery source block header.

19. The computer readable storage media of claim 17, wherein the instructions comprise instructions operable to:

apply a logical fragmentation to each source media packet that is described by an ordered presentation of first and second fragments, enabling the determination of packet lengths in a split recovery process without the use of an explicit fragmentation map.

20. The computer readable storage media of claim 16, wherein the downstream receiving device is a mid-point device located upstream from an endpoint device, and further comprising instructions operable to:

decode the self-describing recovery packets to perform error correction of the source media packets and to generate a set of error corrected source media packets;

generate a consolidated media stream that includes the error corrected source media packets;

generate, based on the error corrected source media packets, one or more further self-describing recovery packets for downstream error correction of the error corrected source media packets, wherein the additional self-describing recovery packets include a mapping to the error corrected source media packets;

send the consolidated media stream that includes the error corrected source media packets to a second downstream receiving device; and send the one or more additional self-describing recovery packets to the second downstream receiving device.

* * * * *